United States Patent
Iwahashi

(10) Patent No.: US 8,922,201 B2
(45) Date of Patent: Dec. 30, 2014

(54) POSITION DETECTING DEVICE FOR DETECTING THE OPERATION POSITION OF AN OPERATING PORTION OF A VEHICLE

(75) Inventor: Masaru Iwahashi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 233 days.

(21) Appl. No.: 13/511,122

(22) PCT Filed: Nov. 10, 2010

(86) PCT No.: PCT/JP2010/069980
§ 371 (c)(1),
(2), (4) Date: May 21, 2012

(87) PCT Pub. No.: WO2011/065224
PCT Pub. Date: Jun. 3, 2011

(65) Prior Publication Data
US 2012/0280676 A1 Nov. 8, 2012

(30) Foreign Application Priority Data
Nov. 30, 2009 (JP) .................................. 2009-271658

(51) Int. Cl.
*G01B 7/30* (2006.01)
*G01D 5/14* (2006.01)

(52) U.S. Cl.
CPC ...................................... *G01D 5/145* (2013.01)
USPC ...................... 324/207.2; 324/207.25; 74/504; 123/399; 701/101

(58) Field of Classification Search
CPC ... G01D 5/145; G01B 7/30; F02D 2009/0294
USPC ........... 324/207.2; 74/504; 123/399; 701/101
See application file for complete search history.

(56) References Cited

U.S. PATENT DOCUMENTS

| | | | | |
|---|---|---|---|---|
| 6,144,125 | A | * | 11/2000 | Birkestrand et al. ......... 310/68 B |
| 2004/0065165 | A1 | * | 4/2004 | Sekiya et al. .................... 74/491 |
| 2006/0081218 | A1 | * | 4/2006 | Hino et al. ...................... 123/399 |
| 2009/0007716 | A1 | * | 1/2009 | Soda et al. ........................ 74/504 |
| 2009/0201014 | A1 | | 8/2009 | Cavallo | |

FOREIGN PATENT DOCUMENTS

| | | | |
|---|---|---|---|
| JP | 2009-098005 | 5/2009 | |
| WO | WO 2005/108197 A1 | 11/2005 | |
| WO | WO 2008/010186 A2 | 1/2008 | |
| WO | WO 2009069487 A1 * | 6/2009 | ............... G01D 5/14 |

* cited by examiner

Primary Examiner — Jay Patidar
(74) *Attorney, Agent, or Firm* — McDermott Will & Emery LLP

(57) ABSTRACT

A position detecting device affixed to a handle bar, wherein the positional displacement between a section to be detected and a detecting section is minimized to reduce the degradation of the detection accuracy. A position detecting device 1 comprising: a section 4 to be detected which is rotated on the basis of the rotational operation of a handle grip 3 provided to a handle bar 2; a detecting section 5 which detects the section 4 to be detected; and a case 6 which contains the section 4 to be detected and the detecting section 5, wherein the position detecting device 1 is also provided with a support member 7 which rotatably supports the section 4 to be detected and to which the detecting section 5 is affixed.

2 Claims, 2 Drawing Sheets

POSITION DETECTING DEVICE FOR DETECTING THE OPERATION POSITION OF AN OPERATING PORTION OF A VEHICLE

RELATED APPLICATIONS

This application is the U.S. National Phase under 35 U.S.C. §371 of International Application No. PCT/JP2010/069980, filed on Nov. 10, 2010, which in turn claims the benefit of Japanese Application No. 2009-271658, filed on Nov. 30, 2009, the disclosures of which Applications are incorporated by reference herein.

TECHNICAL FIELD

The present invention relates to a position detecting device which detects the operation position of operating means such as a handle grip of a two-wheel vehicle with a magnetism detecting portion such as a Hall IC.

BACKGROUND ART

A conventional position detector includes a handle grip attached rotatably to a handle bar of a two-wheel vehicle, a moving member rotating in synchronization with the rotation operation of the handle grip and including a closed magnetic circuit serving as a portion to be detected made of a magnet or a magnetic material, a magnetism detecting portion serving as a detecting portion detecting a leakage magnetic field produced in the closed magnetic circuit, a circuit board having the magnetism detecting portion mounted thereon, and a frame body accommodating the moving member, the magnetism detecting portion, the circuit board and the like (see, for example, Patent Document 1).

RELATED ART REFERENCE

Patent Document

Patent Document 1: JP-A-2009-98005

SUMMARY OF THE INVENTION

Problems that the Invention is to Solve

In the conventional position detecting device, the moving member including the closed magnetic circuit is placed to surround the handle bar to be rotatably supported, and the magnetism detecting portion detecting the leakage magnetic field produced in the closed magnetic circuit is fixed to the frame body fixed to the handle bar with the circuit board interposed.

The handle bar to which the position detecting device is attached does not need to require exacting dimensional tolerances in terms of its applications. Since the closed magnetic circuit serving as the portion to be detected and the magnetism detecting portion serving as the detecting portion are separately provided with respect to the handle bar, the position relationship between the closed magnetic circuit and the magnetism detecting portion may be disadvantageously deviated from the position relationship defined initially in design to reduce the detection accuracy.

The present invention has been made in view of the above-mentioned problem, and it is an object thereof to provide a position detecting device fixed to a handle bar, in which it is possible to suppress displacement of a portion to be detected from a detecting portion to prevent a reduction in detection accuracy.

Means for Solving the Problems

A position detecting device according to the present invention includes a portion to be detected rotated based on rotation operation of a handle grip provided for a handle bar, a detecting portion detecting the portion to be detected, and a case accommodating the portion to be detected and the detecting portion, including a support member rotatably supporting the portion to be detected and fixing the detecting portion.

The portion to be detected is provided by a magnetic member and the detecting portion is provided by a magnetism detecting portion detecting a change in magnetic flux density of the magnetic member.

The support member is formed to surround the handle bar.

Advantage of the Invention

As described above, according to the present invention, the position detecting device fixed to the handle bar can be provided in which it is possible to suppress displacement of the portion to be detected from the detecting portion to prevent a reduction in detection accuracy.

MODE FOR CARRYING OUT THE INVENTION

Figure 1:
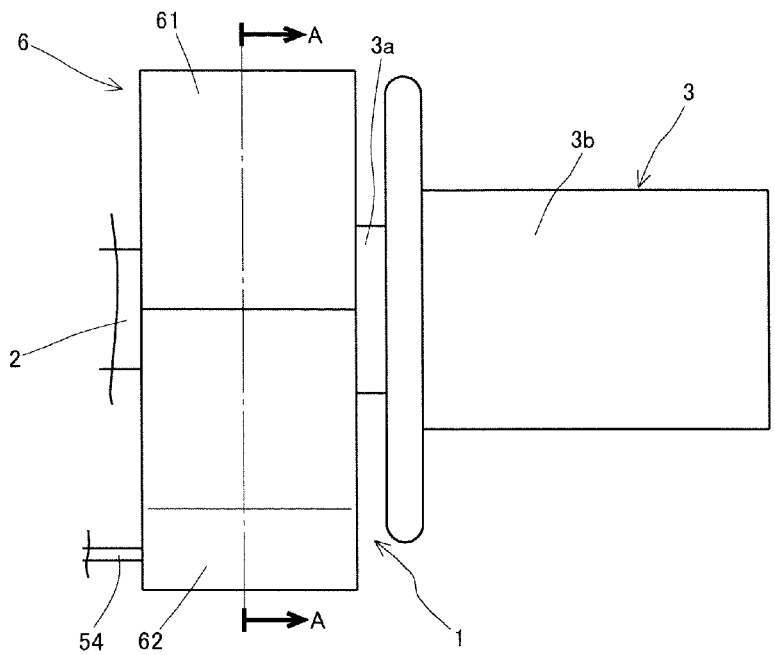
[FIG. 1] A side view of a position detecting device according to a first embodiment of the present invention.
Figure 2:
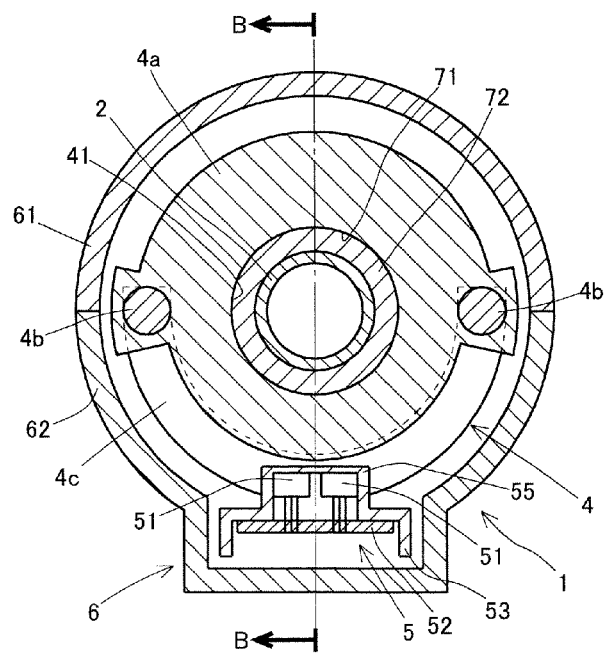
[FIG. 2] A section view taken along a line A-A in FIG. 1.

A first embodiment of the present invention will hereinafter be described with an example of a position detecting device which detects the operation position (rotation angle) of a handle grip provided rotatably for a handle bar of a two-wheel vehicle with reference to the accompanying drawings.

A position detecting device 1 of the present invention is provided for a handle bar 2 of a two-wheel vehicle, not shown, and includes a handle grip 3, a portion to be detected 4 rotating together with the handle grip 3, a detecting portion 5 detecting the portion to be detected 4, a support member 7 supporting rotatably the portion to be detected 4 and fixing the detecting portion 5, and a case 6 accommodating the portion to be detected 4 and the detecting portion 5.

The handle bar 2 is made of metal such as iron and aluminum and has a cylindrical shape.

The handle grip 3 is formed of a sleeve 3a and a grip portion 3b. The sleeve 3a has a cylindrical shape made of synthetic resin and is positioned rotatably on the outer periphery of the handle bar 2. The sleeve 3a includes a collar portion 3c at the end on the left side in FIG. 3. The collar portion 3c has a disc shape and is provided without breaks on the outer periphery of the handle grip 3. A connecting portion 3d is provided at a portion of the edge that connects to the portion to be detected 4 and transfers the rotation of the handle grip 3.

The grip portion 3b is a portion held by a driver, is made of an elastic member such as rubber, covers the outer periphery of the sleeve 3a without breaks, and is fixed tightly to the sleeve 3a.

The portion to be detected 4 is formed of a base member 4a, a magnet 4b, and a yoke 4c, and constitutes a magnetic member.

The base member 4a is made of synthetic resin, has an annular shape, includes a hole portion 41 through which the support member 7 passes, and is rotatably supported on the support member 7. The base member 4a has a receiving portion 42 made of a recess into which the connecting portion 3d provided for the handle grip 3 is inserted. The insertion of the connecting portion 3d of the handle grip 3 into the receiving portion 42 transfers the rotation of the handle grip 3 to the base member 4a to rotate the portion to be detected 4.

The magnet 4b is made of permanent magnet and has a column shape, and two magnets 4b are provided in the present embodiment. Both of the two magnets 4b are fixed to the base member 4a.

The yoke 4c is made of metal soft magnetic material and has a plate form and an arc shape. The yoke 4c is fixed to the base member 4a. The single yoke 4c is provided. The yoke 4c is in contact with the two magnets 4b at both ends and forms a closed magnet circuit.

The detecting portion 5 is made of a magnetism detecting element 51 and a circuit board 52 and constitutes a magnetism detecting portion.

The magnetism detecting element 51 converts a change in magnetic flux density into an electric signal, and is provided by using a Hall element, for example. Two magnetism detecting elements 51 are provided, are provided along the plate face of the yoke 4c, and detect a change in leakage magnetic flux density of the closed magnet circuit formed of the magnet 4b and the yoke 4c.

The circuit board 52 includes a conductive path, not shown, and electronic parts and the like connected electrically to the conductive path on an insulating base made of glass epoxy resin or the like. The magnetism detecting element 51 is electrically connected to the circuit board 52. The circuit board 52 is electrically connected to wiring 54 connected to an external circuit. The signal of the magnetism detecting element 51 is output to the external circuit through the circuit board 52 and the wiring 54.

Reference numeral 53 shows a circuit holder portion 53 which is formed integrally with the support member 7. The circuit holder portion 53 has a cup shape and accommodates the magnetism detecting element 51 and the circuit board 52. Especially, the circuit holder portion 53 includes a bag-shaped accommodating portion 55 which accommodates the magnetism detecting element 51, and the magnetism detecting element 51 is fitted into the accommodating portion 55. The accommodating portion 55 is close to the yoke 4c and is provided along the plate face of the yoke 4c.

The support member 7 is made of synthetic resin, has an annular shape, is a tubular body with a hole portion 71 through which the handle bar 2 passes, and covers the outer periphery of the handlebar 2. The support member 7 is fixed to the handle bar 2 by means, not shown, such that the support member 7 is not rotated. The support member 7 includes a rotation support portion 72 of a cylindrical shape and rotatably supports the portion to be detected 4.

Figure 3:
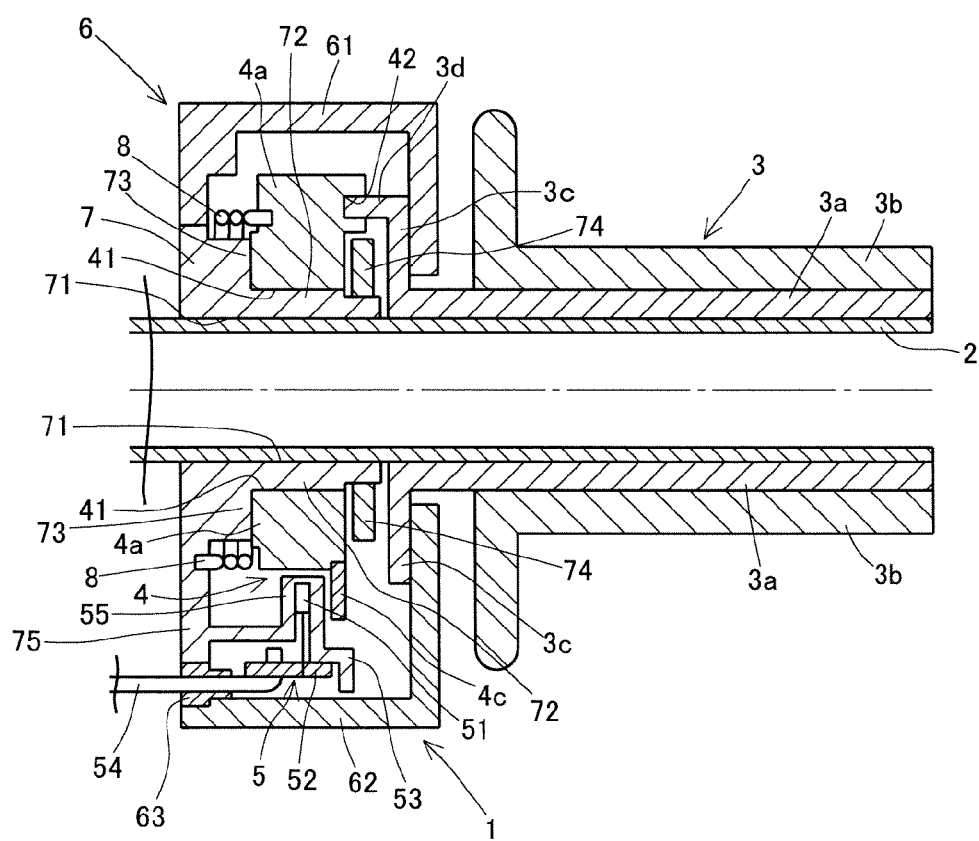
[FIG. 3] A section view taken along a line B-B in FIG. 2.

The support member 7 includes a movement regulating portion 73 having an outer periphery larger than the outer periphery of the rotation support portion 72 on the left side of the rotation support portion 72 in FIG. 3. The movement regulating portion 73 regulates the movement of the portion to be detected 4 to the left in FIG. 3 in the rotation axis direction of the handle grip 3.

In the support member 7, a removal preventing member 74 is attached on the right side of the rotation support portion 72 in FIG. 3. The removal preventing portion 74 prevents removal of the portion to be detected 4 from the rotation support portion 72 and regulates the movement of the portion to be detected 4 to the right in FIG. 3 in the rotation axis direction of the handle grip 3.

The support member 7 includes a support portion 75 on the left side of the movement regulating portion 73. The circuit holder portion 53 of the detecting portion 5 is integrally formed with the support portion 75. Reference numeral 8 shows a return spring formed of a coil spring and returns the handle grip 3 operated by the driver to the initial position. One end of the return spring 8 is fixed to the base member 4a of the portion to be detected 4, and the other end thereof is fixed to the support member 7.

The case 6 is formed of a first case 61 and a second case 62. Each of the first and second cases 61 and 62 is made of synthetic resin and has a semicircular cup shape. The first and second cases 61 and 62 are separated along the rotation central axis of the handle grip 3. The first and second cases 61 and 62 are fixed by appropriate means such as welding.

The case 6 accommodates the portion to be detected 4 and the detecting portion 5. In the present embodiment, the support member 7 also forms part of the outer cover which accommodates the portion to be detected 4 and the detecting portion 5 together with the case 6. The case 6 is fixed by means, not shown, to the handle bar 2 such that the case 6 is not rotated.

Reference numeral 63 shows a packing through which the wiring 54 of the detecting portion 5 passes.

With the configuration described above, it is possible to suppress displacement of the portion to be detected 4 from the detecting portion 5 to prevent a reduction in detection accuracy in the position detecting device 1 fixed to the handle bar 2.

The mounting of the portion to be detected 4 and the detecting portion 5 on the support member 7 allows the portion to be detected 5, the detecting portion 5, and the support member 7 to be treated as a single assembled part, so that the handling is facilitated in manufacturing steps or mounting steps on the vehicle to enable improved operability and reduced cost.

INDUSTRIAL APPLICABILITY

The present invention can be used for the position detecting device which detects the operation position of the operating means such as a handle grip of a two-wheel vehicle.

DESCRIPTION OF REFERENCE NUMERALS AND SIGNS 1 position detecting device
2 handle bar
3 handle grip
4 portion to be detected (magnetic member)
4a base member
4b magnet
4c yoke
5 detecting portion (magnetism detecting portion)
6 case
7 support member
51 magnetism detecting element
52 circuit board
72 rotation support portion

The invention claimed is:
1. A position detecting device comprising:
a portion to be detected rotated based on rotation operation of a handle grip provided for a handle bar and having a receiving portion comprised of a recess into which a connecting portion of the handle grip is inserted to transfer the rotation of the handle grip;
a detecting portion detecting the portion to be detected;
a support member surrounds the handle bar and rotatably supporting the portion to be detected and comprising a holder portion accommodating the detecting portion.

2. The position detecting device according to claim 1, characterized in that the portion to be detected is provided with a magnetic member and the detecting portion is provided by a magnetism detecting portion detecting a change in magnetic flux density of the magnetic member.

\* \* \* \* \*